(12) United States Patent
Patel et al.

(10) Patent No.: US 11,828,776 B2
(45) Date of Patent: Nov. 28, 2023

(54) CIRCUITS AND METHODS FOR VOLTAGE DETECTION IN INTEGRATED CIRCUITS

(71) Applicant: Intel Corporation, Santa Clara, CA (US)

(72) Inventors: Pratik Patel, Hillsboro, OR (US); Sriram Vangal, Portland, OR (US); Patrick Koeberl, Portland, OR (US); Miguel Bautista Gabriel, Portland, OR (US); James Tschanz, Portland, OR (US); Carlos Tokunaga, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 733 days.

(21) Appl. No.: 16/829,582

(22) Filed: Mar. 25, 2020

(65) Prior Publication Data

US 2020/0226295 A1 Jul. 16, 2020

(51) Int. Cl.
| | |
|---|---|
| *G01R 19/165* | (2006.01) |
| *G06F 21/75* | (2013.01) |
| *H03K 5/00* | (2006.01) |
| *H03K 3/037* | (2006.01) |
| *H03K 19/21* | (2006.01) |

(Continued)

(52) U.S. Cl.
CPC .... *G01R 19/16533* (2013.01); *G06F 11/0736* (2013.01); *G06F 11/0757* (2013.01); *G06F 11/0772* (2013.01); *G06F 21/755* (2017.08); *H01L 23/576* (2013.01); *H03K 3/037* (2013.01); *H03K 5/00* (2013.01); *H03K 19/21* (2013.01);

(Continued)

(58) Field of Classification Search
CPC .......... G01R 19/16533; G06F 11/0736; G06F 11/0757; G06F 21/755
See application file for complete search history.

(56) References Cited

U.S. PATENT DOCUMENTS

| | | | |
|---|---|---|---|
| 9,229,054 B2 | 1/2016 | Bowman et al. | |
| 9,432,025 B1* | 8/2016 | Khor | H03L 7/0891 |
| 2009/0135885 A1* | 5/2009 | Lin | H04B 1/69 |
| | | | 375/E1.001 |

OTHER PUBLICATIONS

James Tschanz et al., "Tunable Replica Circuits and Adaptive Voltage-Frequency Techniques for Dynamic Voltage, Temperature, and Aging Variation Tolerance," 2009 Symposium on VLSI Circuits Digest of Technical Papers, pp. 112-113.

(Continued)

*Primary Examiner* — Adolf D Berhane
*Assistant Examiner* — Afework S Demisse
(74) *Attorney, Agent, or Firm* — InventIQ Legal LLP; Steven J. Cahill

(57) ABSTRACT

A voltage detection circuit includes a tunable delay circuit that receives a supply voltage and that generates a delayed signal in response to an input signal. A control circuit causes a first adjustment in a delay provided by the tunable delay circuit to the delayed signal. An error detection circuit generates an error indication in an error signal in response to a change in a timing of the delayed signal relative to a clock signal caused by the first adjustment in the delay provided to the delayed signal. The control circuit causes a second adjustment in the delay provided by the tunable delay circuit to the delayed signal in response to the error indication. The error detection circuit causes the error signal to be indicative of the supply voltage reaching a threshold voltage after the second adjustment in the delay.

22 Claims, 9 Drawing Sheets

(51) Int. Cl.
*H01L 23/00* (2006.01)
*G06F 11/07* (2006.01)

(52) U.S. Cl.
CPC .............. *H03K 2005/00058* (2013.01); *H03K 2005/00078* (2013.01)

(56) References Cited

OTHER PUBLICATIONS

Keith A. Bowman et al., "Energy-Efficient and Metastability-Immune Resilient Circuits for Dynamic Variation Tolerance," IEEE Journal of Solid-State Circuits, vol. 44, No. 1, Jan. 2009, 2008 IEEE, pp. 49-63.

* cited by examiner

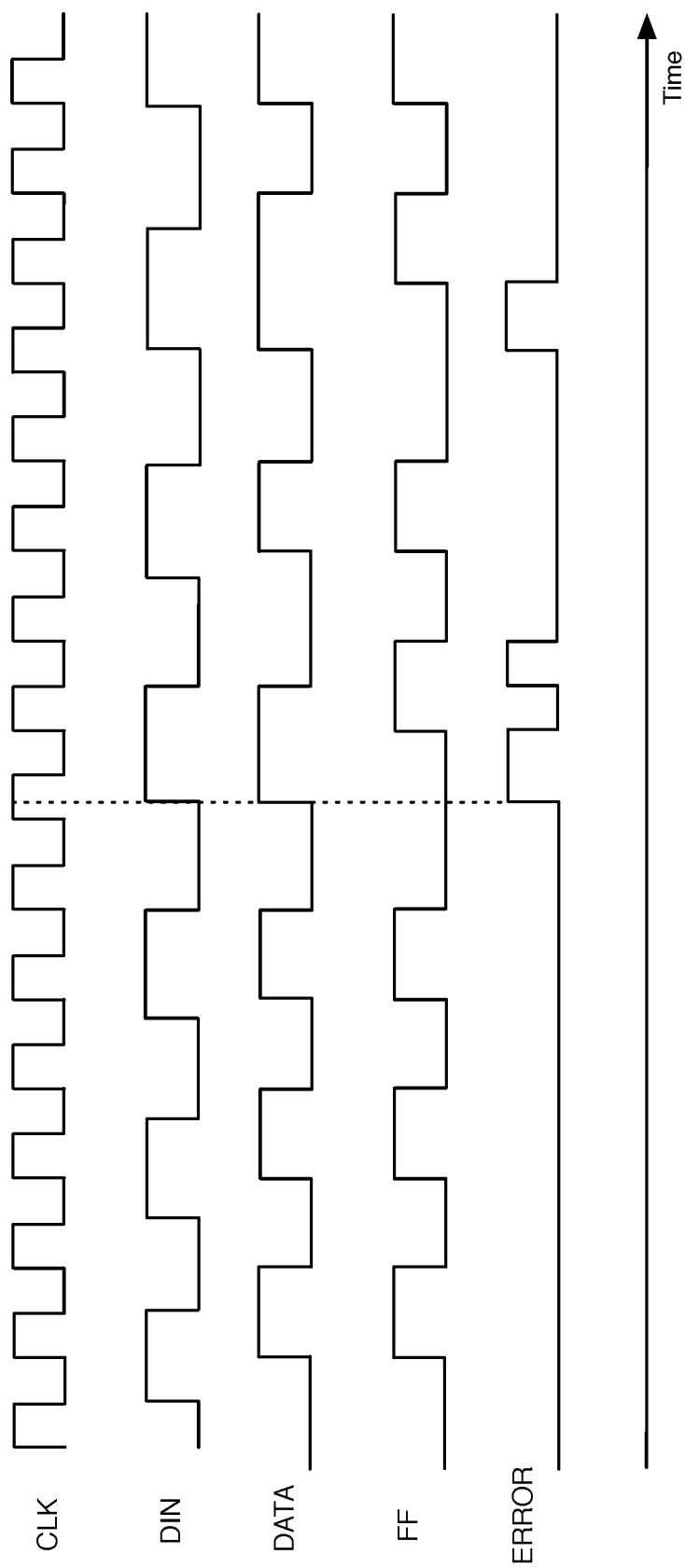

CIRCUITS AND METHODS FOR VOLTAGE DETECTION IN INTEGRATED CIRCUITS

FIELD OF THE DISCLOSURE

The present disclosure relates to electronic circuits, and more particularly, to circuits and methods for voltage detection in integrated circuits.

BACKGROUND

A hacker can attempt voltage tampering of an integrated circuit by lowering a supply voltage provided to the integrated circuit to create a voltage glitch. The reduced supply voltage may cause circuitry in the integrated circuit to violate timing requirements, for example, causing a timing failure if the logic slow down caused by a reduced supply voltage is more than the reduction in the frequency of the clock signal. If security functions fail in response to the voltage tampering, security logic may be compromised, potentially allowing content to be stolen from a secure region of the integrated circuit.

BRIEF DESCRIPTION OF THE DRAWINGS

FIG. 5A is a timing diagram that illustrates examples of waveforms for various signals generated by the voltage attack detection circuit of FIG. 1, according to an embodiment.

DETAILED DESCRIPTION

According to some embodiments, a voltage attack in an integrated circuit can be detected using a tunable delay circuit, an error detection sequential circuit, and a control circuit that operates from the same supply voltage as the logic circuitry being monitored and protected. The tunable delay circuit delays an output signal of the error detection sequential circuit to generate a delayed signal. The tunable delay circuit receives a supply voltage. The control circuit causes first adjustments to a delay provided by the tunable delay circuit to the delayed signal in response to an enable signal. The error detection sequential circuit generates an indication of an error in an error signal in response to a change in a timing of the delayed signal relative to a clock signal that is caused by at least one of the first adjustments in the delay provided to the delayed signal. The control circuit causes a second adjustment to the delay provided by the tunable delay circuit to the delayed signal in response to the indication of the error in the error signal and based on a regress value indicated by a control input. The error detection sequential circuit generates an attack indication in the error signal when the supply voltage has reached a threshold voltage after the second adjustment to the delay. The threshold voltage may, as an example, be calculated by adding or subtracting a regress voltage determined based on the control input from a nominal supply voltage.

Figure 1:
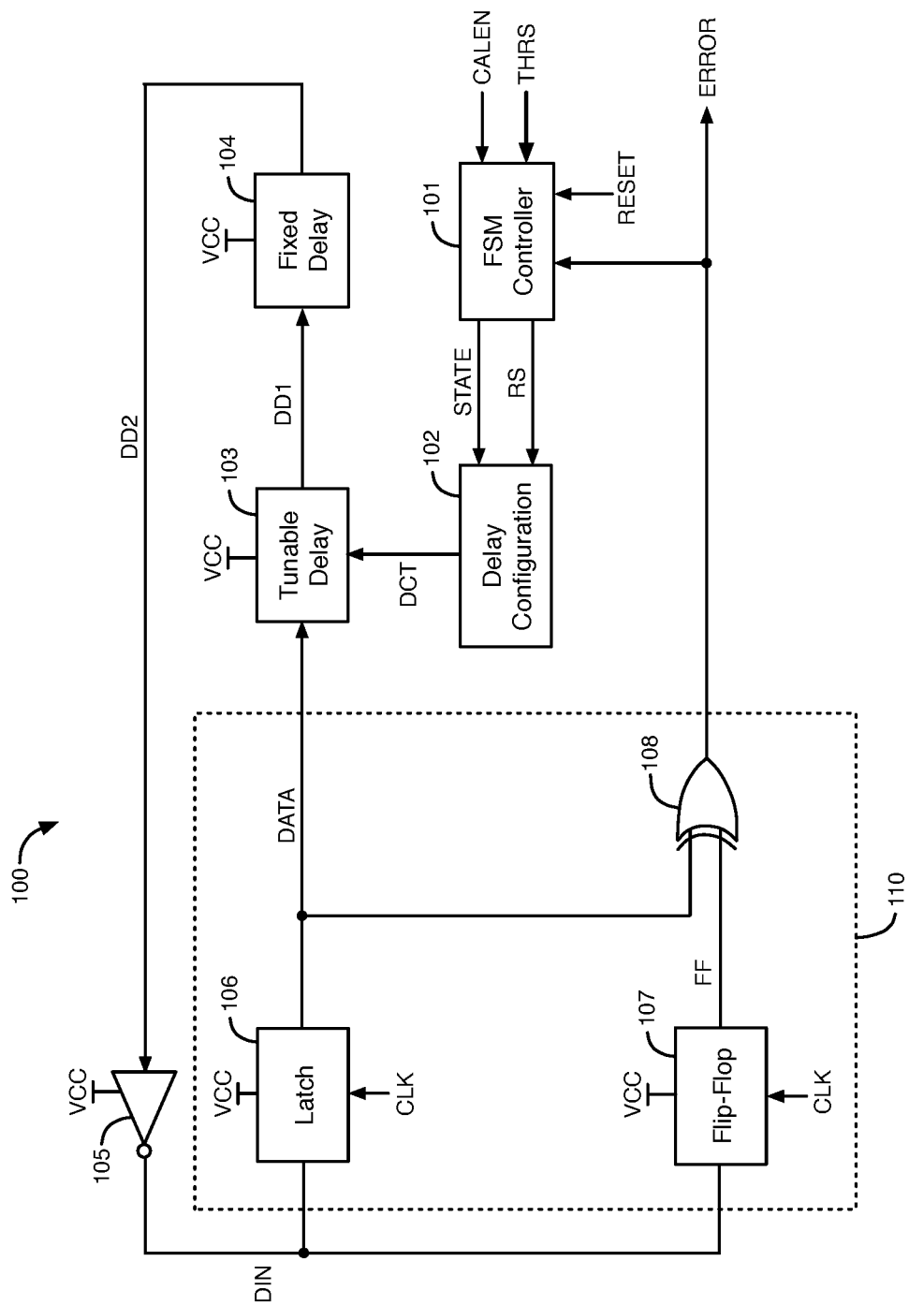
FIG. 1 illustrates an example of a voltage attack detection circuit, according to an embodiment.

FIG. 1 illustrates an example of a voltage attack detection circuit 100, according to an embodiment. The voltage attack detection circuit 100 of FIG. 1 includes a self-calibrating tunable replica circuit (SC-TRC), as will be described in further detail below. As shown in Figure (FIG. 1, voltage attack detection circuit 100 includes finite state machine (FSM) controller circuit 101, delay configuration circuit 102, tunable delay circuit 103, fixed delay circuit 104, inverter circuit 105, latch circuit 106, flip-flop circuit 107, and XOR logic gate circuit 108. Latch circuit 106, flip-flop circuit 107, and XOR logic gate circuit 108 are part of an error detection sequential (EDS) circuit 110.

Figure 2:
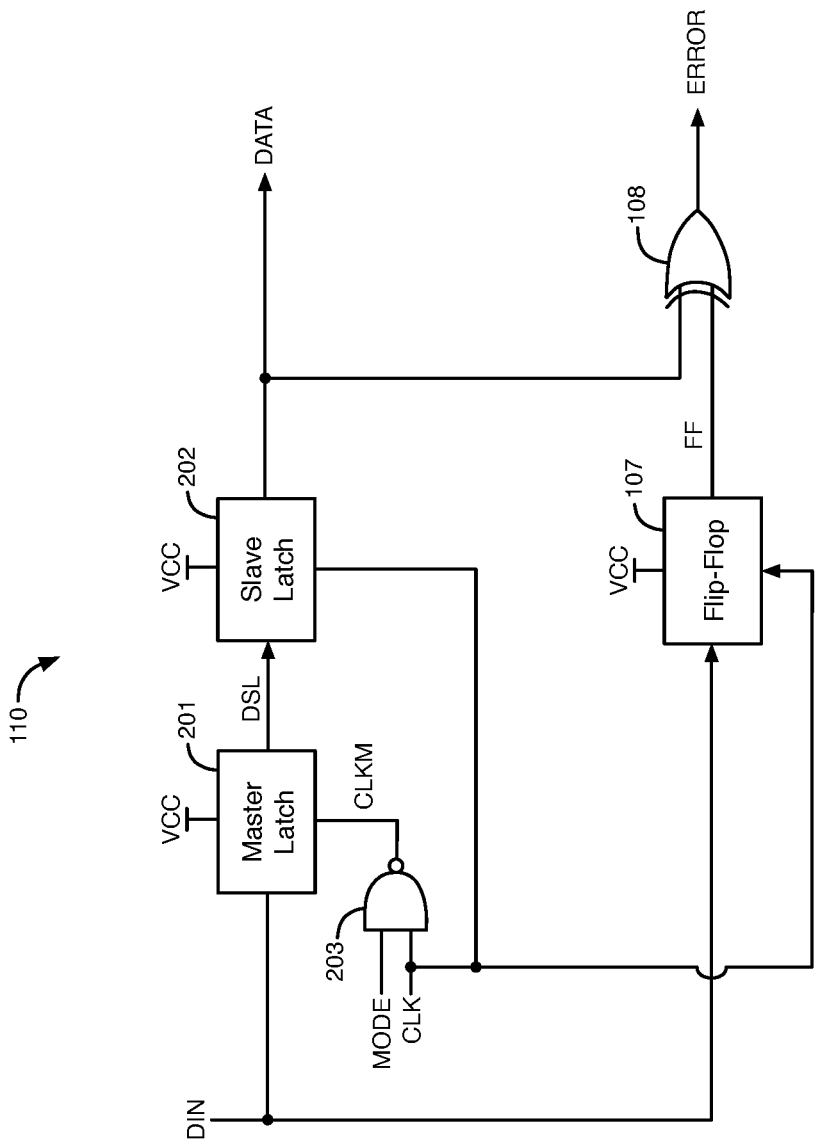
FIG. 2 illustrates further details of the error detection sequential (EDS) circuit of FIG. 1, according to an embodiment.

FIG. 2 illustrates further details of the error detection sequential (EDS) circuit 110 of FIG. 1, according to an embodiment. As shown in FIG. 2, EDS circuit 110 includes a master latch circuit 201, a slave latch circuit 202, a NAND logic gate circuit 203, flip-flop circuit 107, and XOR logic gate circuit 108. The circuitry shown in FIGS. 1-2 may be provided in any type of integrated circuit (IC), such as a programmable logic IC, a microprocessor IC, a graphics processing unit (GPU) IC, or an application specific IC. As a specific example that is not intended to be limiting, circuit 100 can be built using unused lookup table primitives in a reconfigurable field programmable gate array (FPGA) to create a dynamic and opportunistic resource-aware security sensor.

FSM controller circuit 101 and delay configuration circuit 102 function as a delay control circuit that controls the adjustable delay of tunable delay circuit 103, as described in detail below. As shown in FIG. 1, a reset signal RESET, a calibration enable signal CALEN, and threshold regress control signals THRS are provided to inputs of the finite state machine (FSM) controller circuit 101. An error signal ERROR from the output of the XOR logic gate circuit 108 is provided to an additional input of FSM controller circuit 101.

FSM controller circuit 101 generates output signals STATE that indicate the current state of a finite state machine (FSM) in the FSM controller circuit 101. FSM controller circuit 101 adjusts the current state of the FSM based on the input signals provided to FSM controller circuit 101, as described in further detail below with respect to FIG. 3. The STATE signals are provided to inputs of delay configuration circuit 102. Delay configuration circuit 102 generates delay code tuning signals DCT based in part on the state of the FSM indicated by the STATE signals. The delay code tuning signals DCT may include one or more signals (bits). Delay configuration circuit 102 may include an encoder that generates encoded delay code tuning signals DCT based on the state indicated by the STATE signals. The encoder may, as specific examples that are not intended to be limiting, encode the delay code tuning signals DCT as a binary code, a thermometer code, a Gray code, or a one-hot code.

Tunable delay circuit 103, fixed delay circuit 104, inverter 105, and latch 106 are coupled together in a loop to form a clock divide by two circuit, which is now described in detail. The delay code tuning signals DCT are provided to control inputs of tunable delay circuit 103. Tunable delay circuit 103 is an adjustable delay circuit.

Tunable delay circuit 103 delays a digital input signal DATA to generate a delayed digital output signal DD1. The delay that the tunable delay circuit 103 provides to the delayed output signal DD1 relative to input signal DATA is set based on the value of the delay code tuning signals DCT. Tunable delay circuit 103 adjusts the delay provided to delayed signal DD1 relative to signal DATA based on changes in the value of the delay code tuning signals DCT. A supply voltage VCC is provided to each of the delay cell circuits in tunable delay circuit 103. The circuitry in tunable delay circuit 103 is powered by the supply voltage VCC.

Tunable delay circuit 103 may, for example, be a replica circuit that replicates the delay in some other part of the same integrated circuit (IC). The tunable delay circuit 103 may, for example, replicate the delay in a data path in the IC and be in physical proximity to the data path. According to a more specific example, the data path that is replicated by delay circuit 103 may be the critical timing path in logic circuitry that is being monitored by voltage attack detection circuit 100. The logic circuitry, including the data path, receives the same supply voltage VCC as voltage attack detection circuit 100. The tunable delay circuit 103 may, for example, replicate the delay in the data path by containing the same types of logic gates connected in the same order as the data path, or by using different types of logic gates that are selected to replicate the delay of the data path.

The delayed output signal DD1 of tunable delay circuit 103 is provided to an input of fixed delay circuit 104. Fixed delay circuit 104 delays the delayed signal DD1 to generate a second delayed digital output signal DD2. The delay that fixed delay circuit 104 provides to the delayed output signal DD2 relative to the delayed input signal DD1 is not adjustable based on a control input. However, the delay that fixed delay circuit 104 provides to the delayed output signal DD2 relative to the delayed input signal DD1 may vary based on process, voltage, and temperature (PVT) variations of the integrated circuit. The supply voltage VCC is also provided to each of the delay circuits in fixed delay circuit 104.

The delayed output signal DD2 is provided to an input of inverter circuit 105. Inverter circuit 105 inverts signal DD2 to generate an inverted digital output signal DIN. Inverter circuit 105 causes the logic state of signal DIN to be the logical inverse of the logic state of signal DD2. Signal DIN is provided to data inputs of latch circuit 106 and flip-flop circuit 107, as shown in FIG. 1. Latch 106 is an asynchronous bi-stable multi-vibrator circuit. Latch circuit 106 causes the current logic state of signal DIN to propagate to its output as digital signal DATA while an input clock signal CLK is in a first logic state. Signal DATA is provided to an input of tunable delay circuit 103. The inversion provided to signal DIN by inverter 105 causes signals DIN, DATA, DD1, and DD2 to continuously oscillate between binary logic states in the clock divide by two circuit. Thus, signals DIN, DATA, DD1, and DD2 are periodic signals. Latch 106 may function as a clock frequency divider circuit. Latch 106 may, for example, cause signal DD2 to have one-half the frequency of the clock signal CLK, such that latch circuit 106 functions as a clock divide-by-2 circuit.

Referring to FIG. 2, a MODE signal and the clock signal CLK are provided to inputs of the NAND logic gate circuit 203. NAND logic gate circuit 203 performs a NAND Boolean logic function on the logic states of clock signal CLK and the MODE signal to generate the logic state of an output clock signal CLKM that is provided to a clock input of master latch 201. The clock signal CLK is also provided to clock inputs of slave latch 202 and flip-flop 107. During an error detection mode of circuit 100, the MODE signal is set to a logic low state (i.e., MODE=0) to cause the master latch 201 to be transparent to signal DIN. Thus, when the MODE signal is in a logic low state, the NAND logic gate 203 causes the clock signal CLKM to remain in a logic high state. When clock signal CLKM remains in a logic high state during the error detection mode (i.e., when the MODE signal is low), master latch 201 continuously causes the current logic state of signal DIN to propagate to the data input of slave latch 202 as signal DSL. In normal master-slave mode, the MODE signal is in a logic high state (i.e., MODE=1), and NAND logic gate 203 provides inverted logic transitions in clock signal CLK to clock signal CLKM.

Slave latch circuit 202 causes the current logic state of the output signal DSL of the master latch 201 to propagate to its output as digital signal DATA while the input clock signal CLK is in a first logic state (e.g., a logic high state). Slave latch circuit 202 prevents the current logic state of signal DSL from propagating to its output as signal DATA while clock signal CLK is in a second logic state (e.g., a logic low state).

Flip-flop circuit 107 is a synchronous bi-stable multi-vibrator circuit. Flip-flop circuit 107 captures the logic state of signal DIN and passes the captured logic state of signal DIN to its output in signal FF only on each logic state transition in the clock signal CLK that occurs in a predefined direction. For example, flip-flop circuit 107 may capture and pass the logic state of signal DIN to signal FF only on each rising edge of the clock signal CLK. Alternatively, flip-flop circuit 107 may capture and pass the logic state of signal DIN to signal FF only on each falling edge of the clock signal CLK.

The output signal DATA of latch 106 and the output signal FF of flip-flop 107 are provided to inputs of XOR logic gate circuit 108. XOR logic gate circuit 108 performs an XOR Boolean logic function on the current logic states of signals DATA and FF to generate the logic state of its output signal ERROR. As mentioned above, the output signal ERROR of XOR logic gate circuit 108 is provided to an input of FSM controller circuit 101. The ERROR signal may also be provided as an output of circuit 100.

Figure 3:
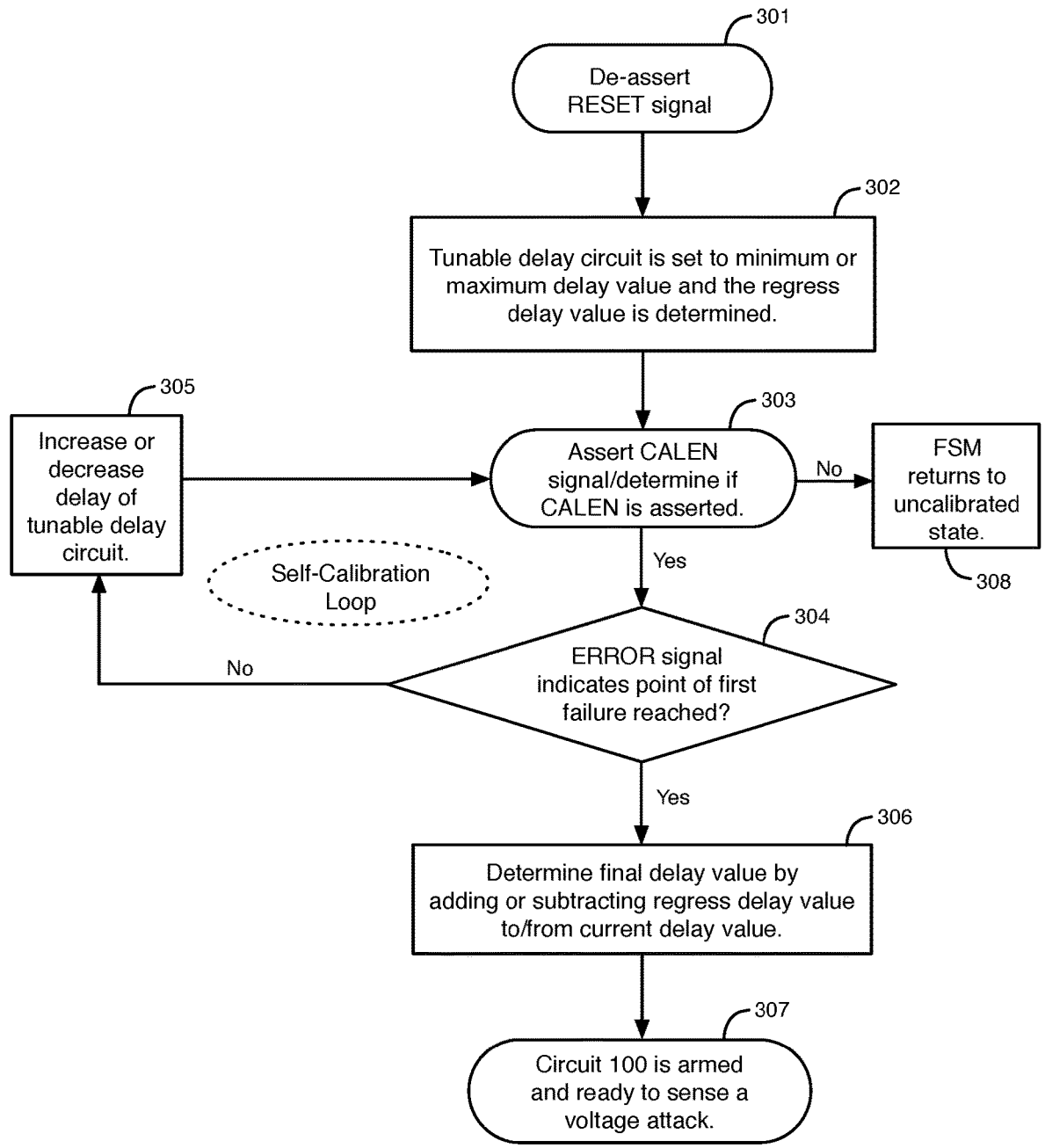
FIG. 3 is a flow chart that illustrates examples of operations that the voltage attack detection circuit of FIG. 1 may perform during an error detection mode, according to an embodiment.
Figure 4:
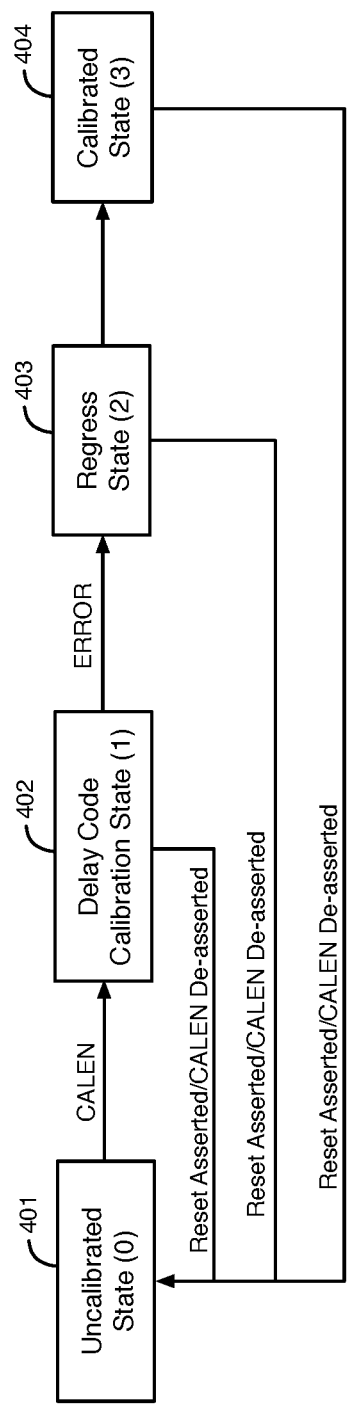
FIG. 4 is a state diagram that illustrates the states of the finite state machine (FSM) in the FSM controller circuit of FIG. 1 and the progression between these states, according to an embodiment.

Further details of an example of the operation of the voltage attack detection circuit 100 during the error detection mode are now discussed in the context of FIGS. 1, 3, and 4. During the error detection mode, circuit 100 detects a decrease (or increase) in the supply voltage VCC that is at or below (or above) a threshold voltage. The threshold voltage is determined based on the threshold regress control signals THRS. FIG. 3 is a flow chart that illustrates examples of operations that the voltage attack detection circuit 100 may perform during the error detection mode, according to an embodiment. FIG. 4 is a state diagram that illustrates the states of the finite state machine (FSM) in the FSM controller circuit 101 and the progression between these states, according to an embodiment.

The error detection mode disclosed with respect to FIGS. 3-4 is ideally performed during quiescent conditions of the IC when the supply voltage VCC is stable (e.g., after reset and before workload execution in the IC). Performing the error detection mode during quiescent conditions ensures that consistent values are determined for the point of first failure, the regress delay, and the fully calibrated delay of delay circuit 103.

In an exemplary embodiment of voltage detection circuit 100, circuits 101-102 initially set tunable delay circuit 103 to its minimum delay value and then increase the delay of delay circuit 103 until the ERROR signal is asserted. The minimum delay value of tunable delay circuit 103 is the minimum delay that circuit 103 can provide to signal DD1 relative to signal DATA. In another exemplary embodiment, circuits 101-102 initially set tunable delay circuit 103 to its maximum delay value when the ERROR signal is asserted and then decrease the delay of delay circuit 103 until the ERROR signal is de-asserted. The maximum delay value of tunable delay circuit 103 is the maximum delay that circuit 103 can provide to signal DD1 relative to signal DATA.

Referring to FIGS. 1 and 4, the RESET signal is initially asserted, and the CALEN signal is initially de-asserted, causing the FSM controller circuit 101 to be in an uncalibrated state (0) 401 (shown in FIG. 4) and in reset. In operation 301 shown in FIG. 3, the RESET is de-asserted (e.g., transitions to a logic low state). In response to the RESET signal being de-asserted, FSM controller circuit 101 is no longer in reset. In operation 302 shown in FIG. 3, FSM controller circuit 101 and delay configuration circuit 102 set the tunable delay circuit 103 to its minimum or maximum delay value. In addition, FSM controller circuit 101 determines a regress delay value in operation 302 using the threshold regress control signals THRS. The threshold regress control signals THRS may, for example, be generated based on user input or retrieved from storage.

In operation 303 shown in FIG. 3, the CALEN signal is asserted (e.g., transitions to a logic high state). In response to the CALEN signal being asserted, the FSM controller circuit 101 transitions from the uncalibrated state 401 to the delay code calibration state (1) 402, as shown in FIG. 4. In operation 303, the FSM controller circuit 101 adjusts the value of the STATE signals to indicate to delay configuration circuit 102 that the FSM is in the delay code calibration state 402. In the delay code calibration state 402, FSM controller circuit 101 and delay configuration circuit 102 perform a self-calibration loop to calibrate the delay of the tunable delay circuit 103.

After operation 303, FSM controller circuit 101 determines if the ERROR signal indicates that the point of first failure (POFF) has been reached in decision operation 304 shown in FIG. 3. As an example, a logic state transition in the ERROR signal may indicate to circuit 101 that the point of first failure has been reached. As another example, the ERROR toggling a predefined number of times may indicate to circuit 101 that the point of first failure has been reached. As yet another example, the ERROR signal remaining in a logic high state for all or most of each period of the clock signal CLK may indicate to circuit 101 that the point of first failure has been reached.

If FSM controller circuit 101 determines that the ERROR signal does not indicate the POFF in decision operation 304, FSM controller circuit 101 and delay configuration circuit 102 increase (or decrease) the delay that the tunable delay circuit 103 provides to signal DD1 relative to signal DATA, in operation 305 shown in FIG. 3. As an example, the delay configuration circuit 102 may adjust the value of the delay code tuning signals DCT in operation 305 in response to the STATE signals indicating that the finite state machine (FSM) is in the delay code calibration state 402. In response to the adjustment in the value of the delay code tuning signals DCT provided by delay configuration circuit 102, tunable delay circuit 103 increases (or decreases) the delay provided to signal DD1 relative to signal DATA. As a more specific example, the delay configuration circuit 102 may contain a counter circuit that increases (or decreases) a count value in operation 305 in response to the STATE signals indicating that the FSM is in the delay code calibration state 402. In this example, the delay configuration circuit 102 may provide the count value in the delay code tuning signals DCT.

During the self-calibration loop, the FSM controller circuit 101 continuously, or at intervals, determines if the CALEN signal is still asserted in operation 303. If the CALEN signal is de-asserted, or if the RESET signal is asserted, during the self-calibration loop, the FSM in FSM controller circuit 101 returns to the uncalibrated state 401 in operation 308, and the self-calibration loop terminates.

Also during the self-calibration loop, the FSM controller circuit 101 continuously, or at intervals, determines if the ERROR signal indicates that the point of first failure (POFF) has been reached in decision operation 304. As long as the ERROR signal indicates that the POFF has not been reached, the FSM in FSM controller circuit 101 remains in state 402, and the delay configuration circuit 102 continues to increase (or decrease) the delay that the tunable delay circuit 103 provides to signal DD1 relative to signal DATA in additional iterations of operation 305.

In response to tunable delay circuit 103 increasing (or decreasing) the delay provided to signal DD1 relative to signal DATA, fixed delay circuit 104 and inverter circuit 105 increase (or decrease) the delays provided to signals DD2 and DIN, respectively, by the same amount that the delay provided to signal DD1 increases (or decreases). As the delay provided to signal DD1 increases (or decreases), the period of signal DIN increases (or decreases), and the period of clock signal CLK remains constant, if there are no changes in the supply voltage VCC and the temperature of the IC.

FIG. 5A is a timing diagram that illustrates examples of waveforms for various signals generated by the voltage attack detection circuit 100 of FIG. 1, according to an embodiment. In the example shown in FIG. 5A, latch 106/202 passes the logic state of signal DIN to signal DATA when clock signal CLK is in a logic high state, flip-flop 107 captures the logic state of signal DIN in response to each rising edge in clock signal CLK, and tunable delay circuit 103 increases the delay provided to signal DD1 during the self-calibration loop. In the example of FIG. 5A, the ERROR signal remains in a logic low state while the rising edges in the oscillating signal DIN occur before the rising edges in clock signal CLK. The ERROR signal transitions to a logic high state in response to a rising edge in signal DIN occurring after a rising edge in clock signal CLK, as shown in FIG. 5A by the dotted line. Additional logic state transitions in the ERROR signal may occur after this initial rising edge in the ERROR signal, as shown in FIG. 5A. FSM controller circuit 101 may be programmed to interpret the first logic state transition in the ERROR signal as the point of first failure (POFF). As other examples, FSM controller circuit 101 may be programmed to interpret the ERROR signal toggling a predefined number of times, or the ERROR signal remaining in a logic high state for all or most of each period of the clock signal CLK, as the point of first failure.

If FSM controller circuit 101 determines that the ERROR signal indicates the POFF in decision operation 304, the self-calibration loop terminates, and the FSM in FSM controller circuit 101 transitions to regress state (2) 403 shown in FIG. 4. In an exemplary embodiment that is not intended to be limiting, the maximum clock latency to self-calibrate circuit 100 having an N number of delay cells in tunable delay circuit 103 is N+2 clock cycles. In the regress state (2) 403, FSM controller circuit 101 and delay configuration circuit 102 stop increasing (or decreasing) the delay that the tunable delay circuit 103 provides to signal DD1 relative to signal DATA. Also, in the regress state (2) 403, FSM controller circuit 101 determines the final delay value of tunable delay circuit 103 according to operation 306.

In operation 306, FSM controller circuit 101 and/or the delay configuration circuit 102 determine the final delay value (F) of tunable delay circuit 103 by subtracting the regress delay value (RS) from the current delay value (CD) of tunable delay circuit 103 if the current delay value CD was generated by increasing the delay of circuit 103 during the self-calibration loop. Thus, the final delay value F=CD−RS. If the current delay value CD was generated by decreasing the delay of circuit 103 during the self-calibration loop, then FSM controller circuit 101 and/or the delay configuration circuit 102 determine the final delay value (F) of tunable delay circuit 103 by adding the regress delay value (RS) to the current delay value (CD) of tunable delay circuit 103 (i.e., F=CD+RS). The regress delay value RS is determined based on the values of one or more of the threshold regress control signals THRS. The current delay value CD of tunable delay circuit 103 is the delay that circuit 103 provides to signal DD1 relative to signal DATA when the ERROR signal first indicates that the POFF has been reached. FSM controller circuit 101 may provide the regress delay value RS to delay configuration circuit 102. FSM controller circuit 101 and delay configuration circuit 102 then set the delay of tunable delay circuit 103 to the final delay value F determined in operation 306. If the CALEN signal is de-asserted or if the RESET signal is asserted in regress state 403, the FSM in FSM controller circuit 101 returns to the uncalibrated state 401.

In operation 307, the FSM in FSM controller circuit 101 transitions from the regress state (2) 403 to the calibrated state (3) 404 shown in FIG. 4. In the calibrated state (3) 404, voltage attack detection circuit 100 is armed and ready to sense a voltage attack on the integrated circuit (IC).

The nominal supply voltage refers to a target supply voltage for VCC. The nominal supply voltage is typically a constant voltage. However, the actual supply voltage VCC may vary from the nominal supply voltage, for example, in response to a voltage attack on the IC or in response to supply current drawn from the supply voltage VCC by other circuits in the IC.

In the calibrated state (3) 404, voltage attack detection circuit 100 senses when the actual supply voltage VCC reaches or passes (i.e., decreases below or increases above) a threshold voltage TH. The threshold voltage TH is calculated using a regress voltage RV. FSM controller circuit 101 determines the regress voltage RV using a value indicated by the threshold regress control signals THRS. In embodiments in which voltage detection circuit 100 detects an undershoot in the actual supply voltage VCC, the threshold voltage TH is set to equal the nominal supply voltage VCC minus the regress voltage RV (i.e., TH=VCC−RV). In embodiments in which voltage detection circuit 100 detects an overshoot in the actual supply voltage VCC, the threshold voltage TH is set to equal the nominal supply voltage VCC plus the regress voltage RV (i.e., TH=VCC+RV).

Figure 5B:
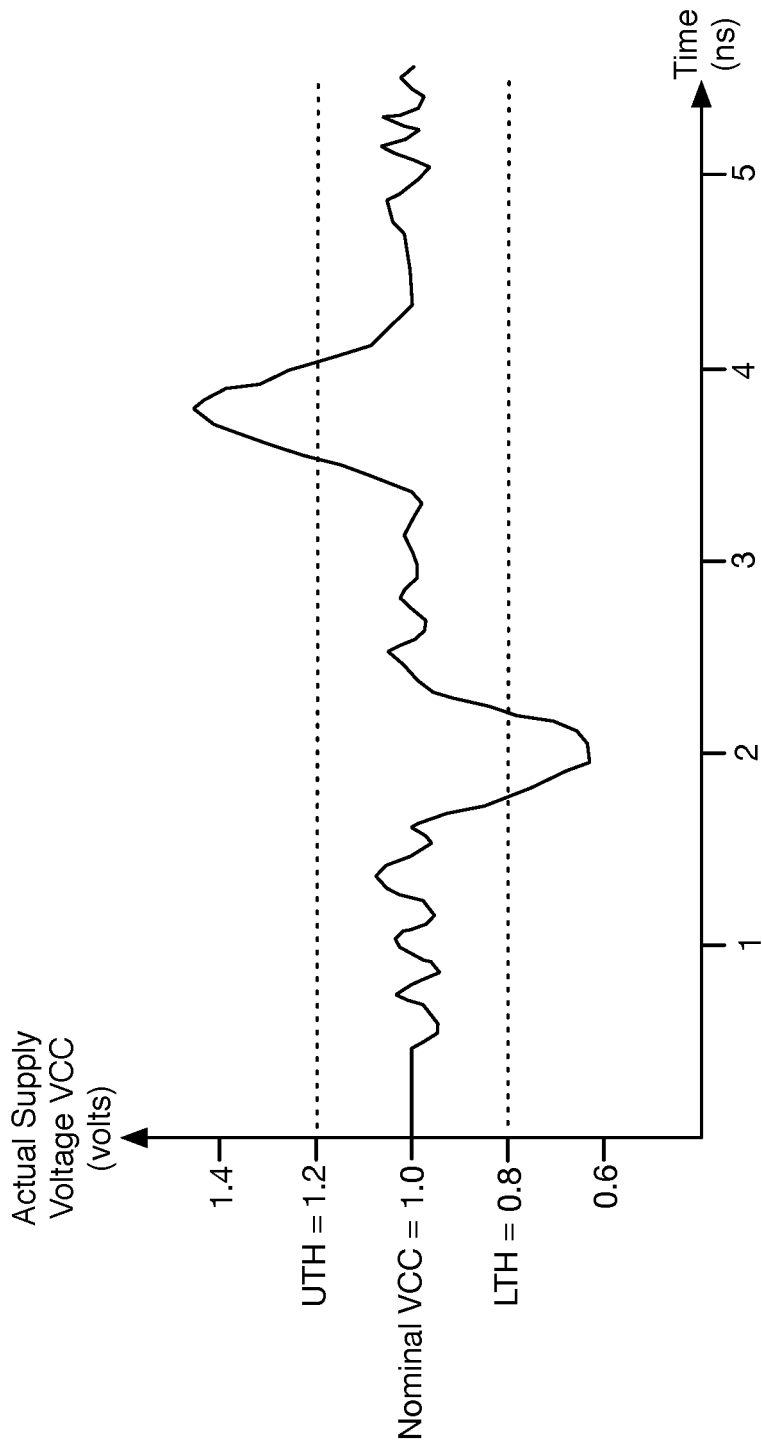
FIG. 5B illustrates an example of how the supply voltage can vary relative to an upper threshold voltage UTH and a lower threshold voltage LTH in an error detection mode, according to an embodiment.

In other embodiments, voltage detection circuit 100 can detect variations in the actual supply voltage VCC that are outside a range of voltages in calibrated state 404. The range of voltages may include voltages that are greater than and less than the nominal supply voltage for VCC. In these embodiments, the voltage detection circuit 100 can detect an overshoot in the actual supply voltage VCC and an undershoot in the actual supply voltage VCC during the error detection mode in the calibrated state 404. FSM controller circuit 101 calculates an upper threshold voltage UTH and a lower threshold voltage LTH. As an example, the upper threshold voltage UTH may be calculated by adding the nominal supply voltage VCC to the regress voltage RV, and the lower threshold voltage LTH may be calculated by subtracting the regress voltage RV from the nominal supply voltage. Voltage detection circuit 100 asserts the ERROR signal during the error detection mode in response to variations in the actual supply voltage VCC that are above the upper threshold voltage UTH or below the lower threshold voltage LTH. FIG. 5B illustrates an example of how the actual supply voltage VCC can vary relative to an upper threshold voltage UTH and a lower threshold voltage LTH in the error detection mode, according to an embodiment. In the example of FIG. 5B, the upper threshold voltage UTH is 1.2 volts, the nominal supply voltage VCC is 1.0 volts, and the lower threshold voltage LTH is 0.8 volts. Time is shown in nanoseconds (ns).

Table 1 below shows 5 exemplary values of the threshold voltage (TH) and the droop percentage (%) from a nominal supply voltage VCC of 0.8 volts for 5 exemplary values of the threshold regress control signals THRS. The regress voltage RV equals the nominal supply voltage VCC (0.8 volts) minus the threshold voltage TH in each of these 5 examples in Table 1. The variation of the droop percentage across these 5 examples is nearly linear.

TABLE 1

| THRS | Droop % | TH (volts) |
| --- | --- | --- |
| 01 h | 2 | 0.784 |
| 02 h | 12 | 0.704 |
| 03 h | 20 | 0.64 |
| 04 h | 28 | 0.576 |
| 05 h | 38 | 0.496 |

When the actual supply voltage VCC reaches or passes the threshold voltage TH (including either the upper or lower threshold voltage), the delay of tunable delay circuit 103 (and possibly the delay of fixed delay circuit 104) have increased or decreased by an amount sufficient to exceed a timing margin that causes EDS circuit 110 to generate one or more logic state transitions in the ERROR signal. When circuit 100 is operating in the error detection mode and in the calibrated state 404, these one or more logic state transitions in the ERROR signal function as an alarm that indicates to FSM controller circuit 101 (and possibly other circuitry in the IC) that a voltage attack has occurred in the IC. In an embodiment, circuit 100 may generate the alarm in the ERROR signal quickly, for example, within 1 clock cycle (CLK) of the timing margin being exceeded. If the CALEN signal is de-asserted, or if the RESET signal is asserted, in calibrated state 404, the FSM in FSM controller circuit 101 returns to the uncalibrated state 401, as shown in FIG. 4.

As discussed above, the tunable delay circuit 103 of FIG. 1 may, in an exemplary embodiment, be a replica data-slice circuit that replicates the delay in a data path in the same IC and be in physical proximity to the replicated data path. The replica data-slice circuit and the data path receive the same supply voltage VCC. In this exemplary embodiment, the digital code indicated by the delay code tuning signals DCT at the point of first failure is indicative of the speed grade of the integrated circuit (IC) for a particular supply voltage VCC and clock frequency (V, F) pair, because the tunable delay circuit 103 is derived from the replica data-slice and is in physical proximity to the actual data path. As a specific example, in a fast integrated circuit die, the delay code tuning signals DCT may indicate a larger digital code at the point of first failure (POFF), because a larger number of delay cells are used to reach the POFF. As another example, in a slower integrated circuit die, the delay code tuning signals DCT may indicate a smaller code at the POFF, because a smaller number of delay cells are used to reach the POFF. In this embodiment, the delay code tuning signals DCT can be used to sort integrated circuit dies after fabrication based on their speed using frequency driven silicon binning.

The digital code indicated by the delay code tuning signals DCT at the point of first failure is dependent on the process, the voltage, and the temperature (PVT) of the IC. For this reason, the digital code indicated by the delay code tuning signals DCT at the point of first failure is a valuable reference point for security uses, such as power optimization and energy recovery using dynamic voltage and frequency scaling. When a voltage attack detection circuit 100 is embedded inside an integrated circuit (IC), the tunable delay circuit 103 tracks the PVT conditions of the IC during operation of the IC. Transient voltage and temperature changes in the IC, if any, may be indicated by changes in the delay of tunable delay circuit 103 and by changes in the ERROR signal, particularly when transitions in the DIN signal occur close to (or after) a transition in the clock signal as shown, for example in FIG. 5A. The periodicity of the ERROR signal is also an excellent indicator of the extent of timing violations and the timing margin recovery. Multiple instances of circuit 100 can be created to implement a network of compact voltage sensors in an IC to diagnose the conditions of the supply voltage power grid in the IC, to indicate voltage faults in the IC, and to flag voltage attacks on the IC for making the IC more secure. Voltage attack detection circuit 100 can also be used to maximize the supply voltage VCC and timing guard bands and to improve silicon energy efficiency in a dynamic, workload dependent manner.

Figure 6:
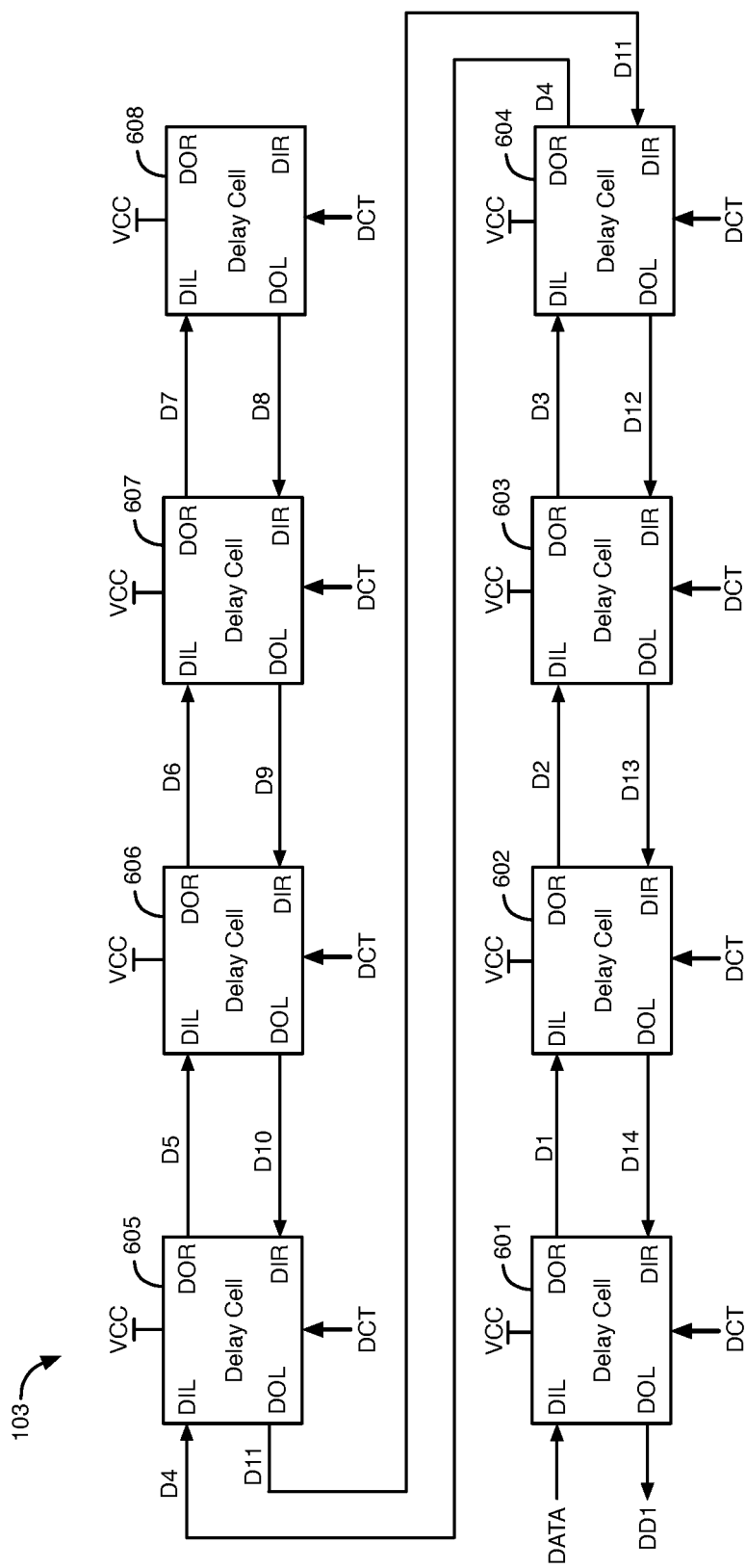
FIG. 6 illustrates an example of the tunable delay circuit of FIG. 1, according to an embodiment.
Figure 7:
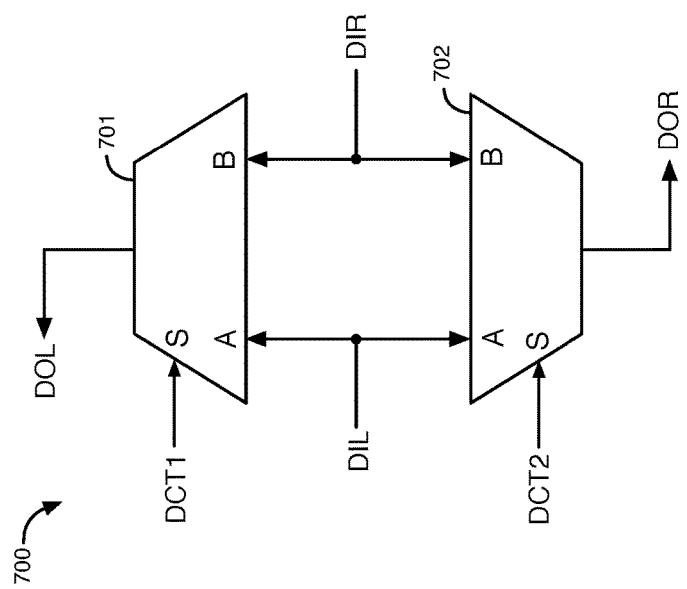
FIG. 7 illustrates an example of a delay cell circuit in the tunable delay circuit of FIG. 6, according to an embodiment.

A detailed example of the tunable delay circuit 103 in voltage attack detection circuit 100 is disclosed herein with respect to FIGS. 6 and 7. The exemplary tunable delay circuit 103 shown in FIGS. 6-7 is provided for illustrative purposes and is not intended to be limiting. Many other types of adjustable delay circuits may be used to implement the tunable delay circuit 103 of FIG. 1.

FIG. 6 illustrates an example of the tunable delay circuit 103 of FIG. 1, according to an embodiment. In the exemplary embodiment of FIG. 6, tunable delay circuit 103 is an adjustable replica delay chain circuit. The tunable delay circuit 103 of FIG. 6 is a symmetric and linearized delay circuit that includes a bi-directional, folded, telescopic delay chain of adjustable delay cell circuits. In the embodiment of FIG. 6, tunable delay circuit 103 includes 8 delay cell circuits 601-608 coupled in a folded, bidirectional delay chain configuration. Although 8 delay cell circuits 601-608 are shown in the example of FIG. 6, it should be understood that tunable delay circuit 103 of FIG. 1 can have any number of delay cell circuits needed to match any specific latency requirements.

As another specific example, tunable delay circuit 103 may have 53 delay cell circuits that are coupled in a bidirectional, folded delay chain, as with the embodiment of FIG. 6. In some embodiments, the delay cell circuits 601-608 are fully synthesizable and can be built using native standard library cells on any process node. A faster delay cell circuit allows for a finer resolution in capturing voltage changes and faster ERROR signal generation. Each of the delay cell circuits in tunable delay circuit 103 receives the same supply voltage VCC, as shown in FIG. 6.

In the embodiment of FIG. 6, the input DATA signal generated by latch 106 is provided to an input of delay cell circuit 601, and the delayed output signal DD1 is generated at an output of delay cell circuit 601. Each of the delay cell circuits 601-608 has a data-forward circuit and a data-return circuit that are controlled by the delay code tuning signals DCT generated by the delay configuration circuit 102 of FIG. 1. One or more of the data-forward circuits in the delay cell circuits 601-608 propagate the rising and falling edges received in the DATA signal along a first delay path through the delay chain. One or more of the data-return circuits in the delay cell circuits 601-608 propagate the rising and falling edges received from the last data-forward circuit coupled in the delay chain along a second delay path through the delay chain to the output in signal DD1.

The digital code of the delay code tuning signals DCT determines how many of the delay cell circuits 601-608 are coupled in the delay chain that propagates rising and falling edges received from signal DATA to the output in signal DD1. The delay configuration circuit 102 adjusts the value of the delay code tuning signals DCT to couple more or less of the delay cell circuits 601-608 into the delay chain that couples the input at signal DATA to the output at signal DD1. For example, an increase in the value of the delay code tuning signals DCT may cause delay circuit 103 to couple more of delay cell circuits 601-608 into the delay chain, increasing the delay provided to signal DD1 relative to signal DATA. As another example, a decrease in the value of the delay code tuning signals DCT may cause delay circuit 103 to couple fewer of the delay cell circuits 601-608 into the delay chain, decreasing the delay provided to signal DD1 relative to signal DATA.

The value of the delay code tuning signals DCT determines the last delay cell circuit coupled in the delay chain. The last delay cell circuit coupled in the delay chain passes the delayed signal in the first delay path to the second delay path through its data-forward and data-return circuits, decoupling subsequent delay cell circuits from the delay chain, as discussed in further detail below.

The tunable delay circuit 103 of FIG. 6 has 8 possible delay settings that are configured by the delay code tuning signals DCT. When signals DCT configure tunable delay circuit 103 to have the minimum delay setting, delay cell circuit 601 is the only delay cell circuit coupled in the delay chain, and transitions in signal DATA propagate through the data-forward and data-return circuits in delay cell circuit 601 back to the output as signal DD1 without passing through any of the other delay cell circuits 602-608.

When signals DCT configure tunable delay circuit 103 to have the second smallest delay setting, delay cell circuits 601 and 602 are the only delay cell circuits coupled in the delay chain. With the second smallest delay setting, transitions in signal DATA propagate through the data-forward circuit in delay cell circuit 601, then to delay cell circuit 602 as signal D1, then through the data-forward and data-return circuits in delay cell circuit 602, then back to delay cell circuit 601 as signal D14, and finally through the data-return circuit in delay cell circuit 601 to the output as signal DD1.

When signals DCT configure tunable delay circuit 103 to have the third smallest delay setting, delay cell circuits 601-603 are the only delay cell circuits coupled in the delay chain. With the third smallest delay setting, transitions in signal DATA propagate through the data-forward circuit in delay cell circuit 601, then to delay cell circuit 602 as signal D1, then through the data-forward circuit in delay cell circuit 602, then to delay cell circuit 603 as signal D2, then through the data-forward and data-return circuits in delay cell circuit 603, then back to delay cell circuit 602 as signal D13, then through the data-return circuit in delay cell circuit 602, then back to delay cell circuit 601 as signal D14, and finally through the data-return circuit in delay cell circuit 601 to the output as signal DD1.

When signals DCT configure tunable delay circuit 103 to have the maximum delay setting, all 8 of the delay cell circuits 601-608 are coupled in the delay chain. With the maximum delay setting, transitions in signal DATA propagate through the data-forward circuits in delay cell circuits 601-607 to signal D7, passing between the delay cell circuits as signals D1-D7 along the first delay path, as shown in FIG. 6. The transitions in signal D7 then propagate through the data-forward and data-return circuits in delay cell circuit 608 to signal D8. The transitions in signal D8 then propagate back through the data-return circuits in delay cell circuits 607, 606, 605, 604, 603, 602, and 601 to signal DD1, passing between the delay cell circuits as signals D8-D14 along the second delay path, as shown in FIG. 6.

FIG. 7 illustrates an example of a delay cell circuit 700, according to an embodiment. Delay cell circuit 700 of FIG. 7 is an example of each of the delay cell circuits 601-608 in the tunable delay circuit 103 of FIG. 6. Delay cell circuit 700 includes two 2-to-1 multiplexer circuits 701 and 702. The A data input of each of the multiplexer circuits 701-702 is coupled to the left input DIL of delay cell circuit 700. The B data input of each of the multiplexer circuits 701-702 is coupled to the right input DIR of the delay cell circuit 700. The output of multiplexer circuit 701 is coupled to the left output DOL of the delay cell circuit 700. The output of multiplexer circuit 702 is coupled to the right output DOR of the delay cell circuit 700. The inputs DIL and DIR and the outputs DOR and DOL of each of the delay cell circuits 601-608 shown in FIG. 6 correspond to the DIL and DIR inputs and the DOR and DOL outputs of delay cell circuit 700, respectively. The select input S of multiplexer circuit 701 is coupled to receive a first one DCT1 of the delay code tuning signals DCT. The select input S of multiplexer circuit 702 is coupled to receive a second one DCT2 of the delay code tuning signals DCT.

In order to configure the delay cell circuit 700 to be the last delay cell circuit coupled in the delay chain, the delay code tuning signal DCT1 is set to a logic state that causes multiplexer circuit 701 to pass the signal transitions received at input DIL to output DOL. For example, as described above, delay cell circuit 608 is the last delay cell circuit coupled in the delay chain when tunable delay circuit 103 has the maximum delay setting, and delay cell circuit 601 is the last delay cell circuit coupled in the delay chain when tunable delay circuit 103 has the minimum delay setting.

In order to configure the delay cell circuit 700 to be one of the delay cell circuits coupled in the delay chain other than the last delay cell circuit coupled in the delay chain, the delay code tuning signal DCT2 is set to a logic state that causes multiplexer 702 to pass the signal transitions received at input DIL to output DOR, and the delay code tuning signal DCT1 is set to a logic state that causes multiplexer 701 to pass the signal transitions received at input DIR to output DOL. When delay cell circuit 700 is in this configuration, multiplexer 702 is the data-forward circuit, and multiplexer 701 is the data-return circuit. Thus, delay cell circuit 700 is configurable to implement each of the delay cell circuits 601-608 of FIG. 6 for each of the 8 configurable delay settings of tunable delay circuit 103.

Figure 8:
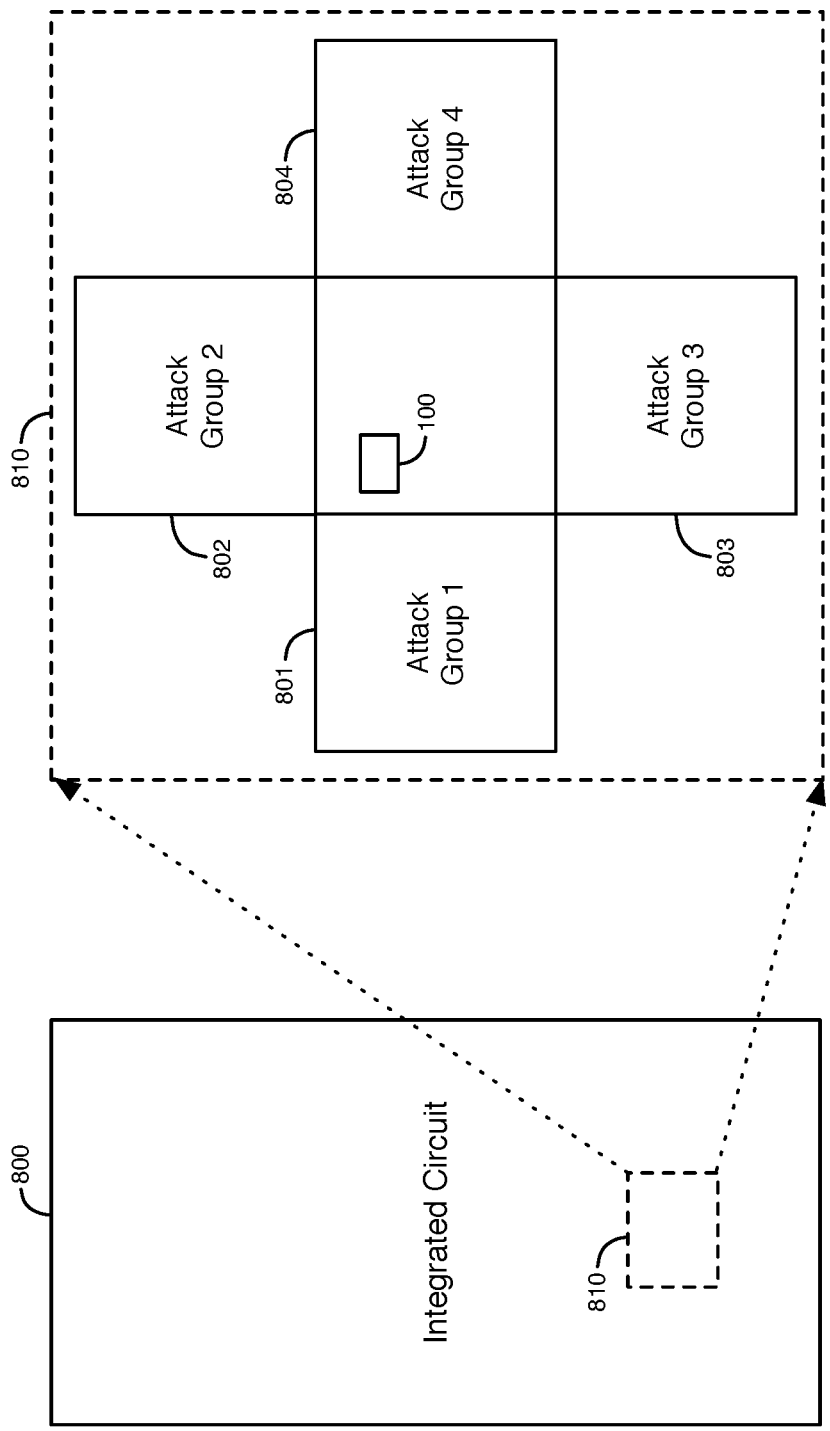
FIG. 8 illustrates a top down view of a floorplan of an example of an integrated circuit (IC) die that includes a voltage attack detection circuit, according to an embodiment.

FIG. 8 illustrates a top down view of a floorplan of an example of an integrated circuit (IC) die 800 that includes a voltage attack detection circuit 100, according to an embodiment. A portion 810 of IC die 800 is shown in expanded detail on the right side of FIG. 8. Portion 810 of IC die 800 includes four attack groups 801-804 of ring oscillators (RO). Each of the attack groups 801-804 of ring oscillators includes one or more ring oscillator circuits. IC die 800 also includes a voltage attack detection circuit 100.

Each of the attack groups 801-804 may reduce the frequency of one or more of its output clock signals in response to a supply voltage reduction attack. Circuit 100 is located between attack groups 801-804 and is coupled to receive the same supply voltage that is provided to the ring oscillators in each of attack groups 801-804. Circuit 100 detects voltage attacks on the supply voltage and indicates the occurrence of a voltage attack in the ERROR signal as described above with respect to FIGS. 1-7, before the voltage attack leads to a timing failure that may compromise security functions in IC die 800.

The embodiments disclosed herein can be incorporated into any suitable integrated circuit or system. For example, the embodiments disclosed herein can be incorporated into numerous types of devices such as processor integrated circuits, central processing units, memory integrated circuits, graphics processing unit integrated circuits, application specific standard products (ASSPs), application specific integrated circuits (ASICs), and programmable logic integrated circuits. Examples of programmable logic integrated circuits include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few. According to an exemplary embodiment, voltage detection circuit 100 may be built using native lookup tables in configurable logic circuits in a programmable logic integrated circuit.

The integrated circuits disclosed in one or more embodiments herein may be part of a data processing system that includes one or more of the following components: a processor; memory; input/output circuitry; and peripheral devices. The data processing system can be used in a wide variety of applications, such as computer networking, data networking, instrumentation, video processing, digital signal processing, or any suitable other application. The integrated circuits can be used to perform a variety of different logic functions.

The following examples pertain to further embodiments. Example 1 is a voltage detection circuit comprising: a tunable delay circuit that generates a first delayed signal in response to an input signal, wherein the tunable delay circuit receives a supply voltage; a control circuit that causes a first adjustment in a delay provided by the tunable delay circuit to the first delayed signal; and an error detection circuit that generates an error indication in an error signal in response to a change in a timing of the first delayed signal relative to a clock signal caused by the first adjustment in the delay provided to the first delayed signal, wherein the control circuit causes a second adjustment in the delay provided by the tunable delay circuit to the first delayed signal in response to the error indication, and wherein the error detection circuit causes the error signal to be indicative of the supply voltage reaching a threshold voltage after the second adjustment in the delay.

In Example 2, the voltage detection circuit of Example 1 can optionally include, wherein the error detection circuit is an error detection sequential circuit comprising: a latch circuit that stores values of a second delayed signal as the input signal in response to the clock signal, wherein the second delayed signal is generated in response to the first delayed signal; a flip-flop circuit that stores values of the second delayed signal in response to the clock signal; and an XOR logic gate circuit that generates the error signal in response to the values stored in the latch and the flip-flop circuit.

In Example 3, the voltage detection circuit of Example 2 can optionally further comprise: a fixed delay circuit coupled to an output of the tunable delay circuit, wherein the fixed delay circuit generates a third delayed signal in response to the first delayed signal; and an inverter circuit coupled between the fixed delay circuit and the latch circuit, wherein the inverter circuit generates the second delayed signal in response to the third delayed signal.

In Example 4, the voltage detection circuit of any one of Examples 1-3 can optionally include, wherein the control circuit comprises: a finite state machine controller circuit that provides a control output indicative of a state of a finite state machine in response to the error signal.

In Example 5, the voltage detection circuit of Example 4 can optionally include, wherein the control circuit further comprises: a delay configuration circuit that causes the tunable delay circuit to increase the delay provided to the first delayed signal in response to the control output indicating a first state of the finite state machine, wherein the delay configuration circuit causes the tunable delay circuit to adjust the delay provided to the first delayed signal by an amount determined based on a control input in response to the control output indicating a second state of the finite state machine, and wherein the threshold voltage is determined based on the control input.

In Example 6, the voltage detection circuit of any one of Examples 1-5 can optionally include, wherein the voltage detection circuit is in a field programmable gate array integrated circuit, and wherein the voltage detection circuit is built using lookup tables in programmable logic circuits.

In Example 7, the voltage detection circuit of any one of Examples 1-6 can optionally include, wherein the tunable delay circuit comprises a bi-directional, folded delay chain comprising adjustable delay cell circuits, and wherein each of the adjustable delay cell circuits comprises a data-forward circuit coupled between a first input and a first output of the adjustable delay cell circuit and a data-return circuit coupled between a second input and a second output of the adjustable delay cell circuit.

In Example 8, the voltage detection circuit of any one of Examples 1-7 can optionally include, wherein the voltage detection circuit is in an integrated circuit, wherein the tunable delay circuit comprises a replica circuit that replicates a delay in a data path in the integrated circuit, and wherein the data path is in the integrated circuit and outside the voltage detection circuit.

Example 9 is an integrated circuit comprising: a first storage circuit that generates a first oscillating signal in response to a clock signal; an adjustable delay circuit that delays the first oscillating signal to generate a second oscillating signal using a supply voltage; a control circuit that causes a first change to a delay that the adjustable delay circuit provides to the second oscillating signal relative to the first oscillating signal; a logic gate circuit that generates an indication of an error in an error signal in response to the first change to the delay provided to the second oscillating signal, wherein the control circuit causes a second change to the delay that the adjustable delay circuit provides to the second oscillating signal relative to the first oscillating signal in response to the indication of the error in the error signal, wherein the logic gate circuit causes the error signal to indicate when the supply voltage reaches a threshold voltage after the second change to the delay provided to the second oscillating signal.

In Example 10, the integrated circuit of Example 9 can optionally further comprise: a second storage circuit that generates a third oscillating signal in response to the clock signal, wherein the logic gate circuit generates the error signal in response to the first and third oscillating signals.

In Example 11, the integrated circuit of Example 10 can optionally include, a fixed delay circuit that generates a fourth oscillating signal in response to the second oscillating signal, wherein the first and second storage circuits store values indicated by a fifth oscillating signal in response to the clock signal, and wherein the fifth oscillating signal is generated based on the fourth oscillating signal.

In Example 12, the integrated circuit of any one of Examples 9-11 can optionally include, wherein the control circuit comprises: a finite state machine controller circuit that provides a control output indicative of a state of a finite state machine; and a delay configuration circuit that causes the adjustable delay circuit to provide the first change to the delay of the second oscillating signal relative to the first oscillating signal in response to the control output indicating a first state of the finite state machine.

In Example 13, the integrated circuit of Example 12 can optionally include, wherein the delay configuration circuit causes the adjustable delay circuit to provide the second change to the delay of the second oscillating signal relative to the first oscillating signal by an amount that is based on a control input in response to the control output indicating a second state of the finite state machine, and wherein the threshold voltage is determined based on the control input.

In Example 14, the integrated circuit of any one of Examples 9-13 can optionally include, wherein the adjustable delay circuit comprises a bi-directional, folded delay chain comprising adjustable delay cell circuits, and wherein each of the adjustable delay cell circuits comprises a first multiplexer circuit coupled between first and second inputs and a first output of the adjustable delay cell circuit and a second multiplexer circuit coupled between the first and second inputs and a second output of the adjustable delay cell circuit.

In Example 15, the integrated circuit of any one of Examples 9-14 can optionally include, wherein the adjustable delay circuit comprises a replica circuit that replicates a delay in a data path in the integrated circuit.

Example 16 is a method for detecting a voltage attack in an integrated circuit, the method comprising: generating a first delayed signal with a tunable delay circuit, wherein the tunable delay circuit receives a supply voltage; causing a first adjustment to a delay provided by the tunable delay circuit to the first delayed signal with a control circuit; generating an indication of an error in an error signal with an error detection circuit in response to the first adjustment to the delay provided to the first delayed signal; causing a second adjustment to the delay provided by the tunable delay circuit to the first delayed signal with the control circuit in response to the indication of the error in the error signal; and generating an attack indication in the error signal when the supply voltage has reached a threshold voltage with the error detection circuit after the second adjustment to the delay.

In Example 17, the method of Example 16 can optionally include, wherein generating the indication of the error in the error signal with the error detection circuit comprises: storing values of a second delayed signal in a first storage circuit in response to a clock signal, wherein the second delayed signal is generated in response to the first delayed signal; storing values of the second delayed signal in a second storage circuit in response to the clock signal; and generating the error signal using a logic gate circuit in response to the values stored in the first and second storage circuits.

In Example 18, the method of any one of Examples 16-17 can optionally include, wherein causing the first adjustment to the delay provided by the tunable delay circuit to the first delayed signal with the control circuit comprises: providing a control output indicative of a state of a finite state machine using a controller circuit; and causing the tunable delay circuit to provide the first adjustment to the delay provided to the first delayed signal with a delay configuration circuit in response to the control output indicating a first state of the finite state machine.

In Example 19, the method of Example 18 can optionally include, wherein causing the second adjustment to the delay provided by the tunable delay circuit to the first delayed signal with the control circuit in response to the indication of the error comprises: causing the tunable delay circuit to provide the second adjustment to the delay provided to the first delayed signal by an amount determined based on a control input with the delay configuration circuit in response to the control output indicating a second state of the finite state machine.

In Example 20, the method of any one of Examples 16-19 can optionally include, wherein generating the first delayed signal with the tunable delay circuit further comprises: delaying the first delayed signal relative to an output signal of the error detection circuit using a replica circuit that replicates a delay in a data path in the integrated circuit, wherein causing the first and second adjustments to the delay provided by the tunable delay circuit to the first delayed signal further comprises generating delay code tuning signals that control the delay using the control circuit, and wherein the method further comprises using a value that occurs in the delay code tuning signals when the error signal indicates the error as an indication of a speed grade of the integrated circuit for silicon binning.

In Example 21, the method of any one of Examples 16-20, can optionally include, wherein causing the first adjustment to the delay provided by the tunable delay circuit to the first delayed signal with the control circuit further comprises: determining if the error signal indicates the error using the control circuit; and adjusting the delay provided by the tunable delay circuit to the first delayed signal relative to an input signal during a self-calibration loop performed by the control circuit if the error signal does not indicate the error.

In Example 22, the method of any one of Examples 16-21 can optionally include, wherein generating the attack indication in the error signal when the supply voltage has reached the threshold voltage with the error detection circuit after the second adjustment to the delay further comprises: detecting an overshoot in the supply voltage that is greater than an upper threshold voltage using the error detection circuit; and detecting an undershoot in the supply voltage that is less than a lower threshold voltage using the error detection circuit.

The foregoing description of the exemplary embodiments of the present invention has been presented for the purpose of illustration. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. A voltage detection circuit comprising:
    a tunable delay circuit that generates a first delayed signal in response to an input signal, wherein the tunable delay circuit receives a supply voltage;
    a control circuit that causes a first adjustment in a delay provided by the tunable delay circuit to the first delayed signal; and
    an error detection circuit that generates an error indication in an error signal in response to a change in a timing of the first delayed signal relative to a clock signal caused by the first adjustment in the delay provided to the first delayed signal,
    wherein the control circuit causes a second adjustment in the delay provided by the tunable delay circuit to the first delayed signal in response to the error indication, and wherein the error detection circuit causes the error signal to be indicative of the supply voltage reaching a threshold voltage after the second adjustment in the delay.

2. The voltage detection circuit of claim 1, wherein the error detection circuit is an error detection sequential circuit comprising:
    a latch circuit that stores values of a second delayed signal as the input signal in response to the clock signal, wherein the second delayed signal is generated in response to the first delayed signal;
    a flip-flop circuit that stores values of the second delayed signal in response to the clock signal; and
    an XOR logic gate circuit that generates the error signal in response to the values stored in the latch and the flip-flop circuit.

3. The voltage detection circuit of claim 2 further comprising:
    a fixed delay circuit coupled to an output of the tunable delay circuit, wherein the fixed delay circuit generates a third delayed signal in response to the first delayed signal; and
    an inverter circuit coupled between the fixed delay circuit and the latch circuit, wherein the inverter circuit generates the second delayed signal in response to the third delayed signal.

4. The voltage detection circuit of claim 1, wherein the control circuit comprises:
    a finite state machine controller circuit that provides a control output indicative of a state of a finite state machine in response to the error signal.

5. The voltage detection circuit of claim 4, wherein the control circuit further comprises:
    a delay configuration circuit that causes the tunable delay circuit to increase the delay provided to the first delayed signal in response to the control output indicating a first state of the finite state machine,
    wherein the delay configuration circuit causes the tunable delay circuit to adjust the delay provided to the first delayed signal by an amount determined based on a control input in response to the control output indicating a second state of the finite state machine, and wherein the threshold voltage is determined based on the control input.

6. The voltage detection circuit of claim 1, wherein the voltage detection circuit is in a field programmable gate array integrated circuit, and wherein the voltage detection circuit is built using lookup tables in configurable logic circuits.

7. The voltage detection circuit of claim 1, wherein the tunable delay circuit comprises a bi-directional, folded delay chain comprising adjustable delay cell circuits, and wherein each of the adjustable delay cell circuits comprises a data-forward circuit coupled between a first input and a first output of the adjustable delay cell circuit and a data-return circuit coupled between a second input and a second output of the adjustable delay cell circuit.

8. The voltage detection circuit of claim 1, wherein the voltage detection circuit is in an integrated circuit, wherein the tunable delay circuit comprises a replica circuit that replicates a delay in a data path in the integrated circuit, and wherein the data path is in the integrated circuit and outside the voltage detection circuit.

9. An integrated circuit comprising:
a first storage circuit that generates a first oscillating signal in response to a clock signal;
an adjustable delay circuit that delays the first oscillating signal to generate a second oscillating signal using a supply voltage;
a control circuit that causes a first change to a delay that the adjustable delay circuit provides to the second oscillating signal relative to the first oscillating signal;
a logic gate circuit that generates an indication of an error in an error signal in response to the first change to the delay provided to the second oscillating signal, wherein the control circuit causes a second change to the delay that the adjustable delay circuit provides to the second oscillating signal relative to the first oscillating signal in response to the indication of the error in the error signal,
wherein the logic gate circuit causes the error signal to indicate when the supply voltage reaches a threshold voltage after the second change to the delay provided to the second oscillating signal.

10. The integrated circuit of claim 9 further comprising:
a second storage circuit that generates a third oscillating signal in response to the clock signal, wherein the logic gate circuit generates the error signal in response to the first and third oscillating signals.

11. The integrated circuit of claim 10 further comprising:
a fixed delay circuit that generates a fourth oscillating signal in response to the second oscillating signal, wherein the first and second storage circuits store values indicated by a fifth oscillating signal in response to the clock signal, and wherein the fifth oscillating signal is generated based on the fourth oscillating signal.

12. The integrated circuit of claim 9, wherein the control circuit comprises:
a finite state machine controller circuit that provides a control output indicative of a state of a finite state machine; and
a delay configuration circuit that causes the adjustable delay circuit to provide the first change to the delay of the second oscillating signal relative to the first oscillating signal in response to the control output indicating a first state of the finite state machine.

13. The integrated circuit of claim 12, wherein the delay configuration circuit causes the adjustable delay circuit to provide the second change to the delay of the second oscillating signal relative to the first oscillating signal by an amount that is based on a control input in response to the control output indicating a second state of the finite state machine, and wherein the threshold voltage is determined based on the control input.

14. The integrated circuit of claim 9, wherein the adjustable delay circuit comprises a bi-directional, folded delay chain comprising adjustable delay cell circuits, and wherein each of the adjustable delay cell circuits comprises a first multiplexer circuit coupled between first and second inputs and a first output of the adjustable delay cell circuit and a second multiplexer circuit coupled between the first and second inputs and a second output of the adjustable delay cell circuit.

15. The integrated circuit of claim 9, wherein the adjustable delay circuit comprises a replica circuit that replicates a delay in a data path in the integrated circuit.

16. A method for detecting a voltage attack in an integrated circuit, the method comprising:
generating a first delayed signal with a tunable delay circuit, wherein the tunable delay circuit receives a supply voltage;
causing a first adjustment to a delay provided by the tunable delay circuit to the first delayed signal with a control circuit;
generating an indication of an error in an error signal with an error detection circuit in response to the first adjustment to the delay provided to the first delayed signal;
causing a second adjustment to the delay provided by the tunable delay circuit to the first delayed signal with the control circuit in response to the indication of the error in the error signal; and
generating an attack indication in the error signal when the supply voltage has reached a threshold voltage with the error detection circuit after the second adjustment to the delay.

17. The method of claim 16, wherein generating the indication of the error in the error signal with the error detection circuit comprises:
storing values of a second delayed signal in a first storage circuit in response to a clock signal, wherein the second delayed signal is generated in response to the first delayed signal;
storing values of the second delayed signal in a second storage circuit in response to the clock signal; and
generating the error signal in response to the values stored in the first and second storage circuits using a logic gate circuit.

18. The method of claim 16, wherein causing the first adjustment to the delay provided by the tunable delay circuit to the first delayed signal with the control circuit comprises:
providing a control output indicative of a state of a finite state machine using a controller circuit; and
causing the tunable delay circuit to provide the first adjustment to the delay provided to the first delayed signal with a delay configuration circuit in response to the control output indicating a first state of the finite state machine.

19. The method of claim 18, wherein causing the second adjustment to the delay provided by the tunable delay circuit to the first delayed signal with the control circuit in response to the indication of the error comprises:
causing the tunable delay circuit to adjust the delay provided to the first delayed signal by an amount determined based on a control input with the delay configuration circuit in response to the control output indicating a second state of the finite state machine.

20. The method of claim 16, wherein generating the first delayed signal with the tunable delay circuit further comprises:
   delaying the first delayed signal relative to an output signal of the error detection circuit using a replica circuit that replicates a delay in a data path in the integrated circuit,
   wherein causing the first and second adjustments to the delay provided by the tunable delay circuit to the first delayed signal further comprises generating delay code tuning signals that control the delay using the control circuit, and
   wherein the method further comprises using a value that occurs in the delay code tuning signals when the error signal indicates the error as an indication of a speed grade of the integrated circuit for silicon binning.

21. The method of claim 16, wherein causing the first adjustment to the delay provided by the tunable delay circuit to the first delayed signal with the control circuit further comprises:
   determining if the error signal indicates the error using the control circuit; and
   adjusting the delay provided by the tunable delay circuit to the first delayed signal relative to an input signal during a self-calibration loop performed by the control circuit if the error signal does not indicate the error.

22. The method of claim 16, wherein generating the attack indication in the error signal when the supply voltage has reached the threshold voltage with the error detection circuit after the second adjustment to the delay further comprises:
   detecting an overshoot in the supply voltage that is greater than an upper threshold voltage using the error detection circuit; and
   detecting an undershoot in the supply voltage that is less than a lower threshold voltage using the error detection circuit.

* * * * *